United States Patent
Yeh et al.

(10) Patent No.: US 10,834,127 B1
(45) Date of Patent: Nov. 10, 2020

(54) DETECTION OF BUSINESS EMAIL COMPROMISE ATTACKS

(71) Applicant: Trend Micro Incorporated, Tokyo (JP)

(72) Inventors: Che-Fu Yeh, Taipei (TW); I-Ting Lien, Taipei (TW); Ming-Lun Li, Taipei (TW); Shih-Yu Chou, Taipei (TW); Po-Yuan Teng, Taipei (TW); Yuan Jiun Tsui, Taipei (TW); Cheng-Hsin Hsu, Taipei (TW); Wen-Kwang Tsao, Taipei (TW); Shih-Han Hsu, Taipei (TW); Pei-Yin Wu, Taipei (TW); Jonathan James Oliver, Kew (AU)

(73) Assignee: Trend Micro Incorporated, Tokyo (JP)

( * ) Notice: Subject to any disclaimer, the term of this patent is extended or adjusted under 35 U.S.C. 154(b) by 294 days.

(21) Appl. No.: 15/961,245

(22) Filed: Apr. 24, 2018

(51) Int. Cl.
| H04L 29/06 | (2006.01) |
| G06Q 10/10 | (2012.01) |
| H04L 12/58 | (2006.01) |
| G06N 20/00 | (2019.01) |

(52) U.S. Cl.
CPC ......... *H04L 63/1483* (2013.01); *G06N 20/00* (2019.01); *G06Q 10/107* (2013.01); *H04L 51/22* (2013.01); *H04L 63/0245* (2013.01)

(58) Field of Classification Search
CPC . H04L 63/1483; H04L 51/22; H04L 63/0245; G06N 20/00; G06Q 10/107
See application file for complete search history.

(56) References Cited

U.S. PATENT DOCUMENTS

| 7,882,183 | B2 * | 2/2011 | Craft | G06Q 10/107 709/204 |
| 8,856,928 | B1 * | 10/2014 | Rivner | G06F 21/566 713/193 |
| 10,275,778 | B1 * | 4/2019 | Maag | G06Q 40/00 |
| 2008/0256638 | A1 * | 10/2008 | Russ | G06F 21/577 726/25 |
| 2015/0081722 | A1 * | 3/2015 | Terada | G06F 16/258 707/748 |
| 2015/0341300 | A1 * | 11/2015 | Swain | G06F 16/287 707/738 |
| 2017/0230323 | A1 * | 8/2017 | Jakobsson | H04L 51/12 |

(Continued)

OTHER PUBLICATIONS

Almomani et al., "A Survey of Phishing Email Filtering Techniques", IEEE Communications Surveys & Tutorials, vol. 15, Issue: 4, Fourth Quarter, (Year: 2013).*

(Continued)

*Primary Examiner* — Morshed Mehedi
(74) *Attorney, Agent, or Firm* — Okamoto & Benedicto LLP (57) ABSTRACT

An email attempting to perpetrate a business email compromise (BEC) attack is detected based on similarity of the email to a known BEC email and on similarity of the email to a user email that would have been sent by the purported sender of the email. Metadata of the email is extracted and input to a BEC machine learning model to find the known BEC email among BEC email samples. The extracted metadata are also input to a personal user machine learning model of the purported sender to generate the user email.

17 Claims, 8 Drawing Sheets

(56) References Cited

U.S. PATENT DOCUMENTS

2018/0013710 A1* 1/2018 Khan .................. H04L 51/12
2020/0067861 A1* 2/2020 Leddy .................. H04L 51/12

OTHER PUBLICATIONS

Email—Wikipedia, 19 sheets [retrieved on Mar. 19, 2018], retrieved from the internet: https://en.wikipedia.org/wiki/Email.

Domain Keys Identified Mail (DKIM)—Wikipedia, 9 sheets [retrieved on Mar. 19, 2018], retrieved from the internet: https://en.wikipedia.org/wiki/DomainKeys_Identified_Mail.

Rong Zheng, et al. "A Framework for Authorship Identification of Online Messages: Writing-Style Features and Classification Techniques", Feb. 1, 2006, pp. 378-393, retrieved from the internet: http://www.pages.drexel.edu/~jl622/docs/Jounals/Zheng_2006JASIST_AuthorshipIdentification.pdf.

Characterizing Authorship Style Using Linguistic Features, 5 sheets [retrieved on Mar. 19, 2018], retrieved from the Internet: http://www.dh2012.uni-hamburg.de/conference/programme/abstracts/characterizing-authorship-style-using-linguistic-features.1.html.

Email agent (infrastructure)—Wikipedia, 2 sheets [retrieved on Mar. 19, 2018], retrieved from the internet: https://en.wikipedia.org/wiki/Email_agent_(infrastructure).

FBI Public Service Announcement, 6 sheets [retrieved on Mar. 19, 2018], retrieved from the internet: https://www.ic3.gov/media/2017/170504.aspx.

Analyzing stylistic similarity amongst authors, 13 sheets [retrieved on Mar. 19, 2018], retrieved from the internet: http://markallenthornton.com/blog/stylistic-similarity/.

Targeted Attacks—Definition—Trend Micro USA, 5 sheets [retrieved on Mar. 19, 2018], retrieved from the internet: https://www.trendmicro.com/vinfo/us/security/definition/targeted-attacks.

Context awareness—Wikipedia, 7 sheets [retrieved on Mar. 19, 2018] retrieved from the internet: https://en.wikipedia.org/wiki/Context_awareness.

Sender Policy Framework—Wikipedia, 8 sheets [retrieved on Mar. 19, 2018] retrieved from the internet: https://en.wikipedia.org/wiki/Sender_Policy_Framework.

Simplified features for email authorship identification, Aug. 2013, 11 sheets, retrieved from the internet: https://www.researchgate.net/publication/262351747_Simplified_features_for_email_authorship_identification.

Machine learning—Wikipedia, 14 sheets [retrieved on Mar. 28, 2018] retrieved from the internet: https://en.wikipedia.org/wiki//Machine_learning.

Meet Trumpot, the bot that tries to talk like Trump—The Washington Post, 4 sheets [retrieved on Mar. 30, 2018] retrieved from the internet: https://www.washingtonpost.com/news/politics/wp/2018/01/16/meet-trumpbot-the-bot-that-tries-to-talk-like-trump/.

TrumpBot : Seq 2 Seq with Pointer Sentinel Model, 9 sheets [retrieved on Mar. 30, 2018] retrieved from the internet: https://www.semanticscholar.org/paper/TrumpBot-%3A-Seq-2-Seq-with-Pointer-Sentinel-Model-Zivkovic/.

Malcolm Walter Corney "Analysing E-mail Text Authorship for Forensic Purposes", Mar. 2003, 180 sheets, retrieved from the internet: https://eprints.qut.edu.au/16069/1/Malcolm_Corney_Thesis.pdf.

* cited by examiner

SENDER: CEO
TO: CHIEF FINANCIAL OFFICER
SUBJECT: WIRE TRANSFER

!HIGH IMPORTANCE

Please process a wire transfer payment in the amount of $250,000 and code to "admin expenses" by COB today. Wiring instructions below...

DETECTION OF BUSINESS EMAIL COMPROMISE ATTACKS

BACKGROUND OF THE INVENTION

1. Field of the Invention

The present invention relates generally to computer security, and more particularly but not exclusively to methods and systems for combating targeted email attacks.

2. Description of the Background Art

Figure 1:
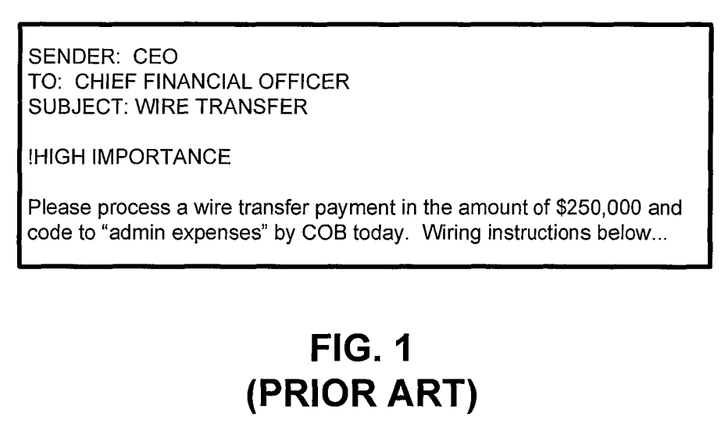
FIG. 1 (Prior Art) shows an example BEC email.

A business email compromise (BEC) attack is a type of cyber fraud that targets organizations (e.g., private companies) that conduct money wire transfers or other financial transaction over a computer network, such as the Internet. BEC attacks often involve electronic mails (emails), which purport to be sent by an officer, e.g., chief executive officer (CEO), of the company. A typical BEC email would direct an employee of the company to electronically transfer funds to another company or individual. FIG. 1 shows an example BEC email that induces the chief financial officer (CFO) of a company to electronically transfer funds to a fraudster's financial account. The BEC email purports to be from the CEO of the company, but is actually from the fraudster.

SUMMARY

In one embodiment, a target email is received from a sender, the sender purportedly being a particular user. The similarity of the target email to a known business email compromise (BEC) email is determined. The similarity of the target email to a user email that would have been sent by the particular user is determined. The target email is deemed to be part of the BEC attack and not sent by the particular user when the target email is more similar to the known BEC email than to the user email.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Generally speaking, machine learning is a field of computer science that gives computers the ability to learn with sample data without being explicitly programmed. Machine learning has been employed in computer security applications to detect spam and malware (i.e., malicious code), etc. A machine learning model may be created by training with sample data of known classification. For example, a machine learning model may be trained using samples of known malware for malware detection, samples of known spam emails for spam detection, and so on. The machine learning model may be trained with particular features of the sample data, which depend on what the machine learning model is being trained to perform or classify.

Embodiments of the present invention may employ one or more machine learning models to detect and prevent a BEC attack. These machine learning models may be trained using suitable machine learning algorithms without detracting from the merit of the present invention. Generally speaking, machine learning models may be trained by random forest, logistic linear regression, deep learning with bag of words, generative modelling, and so on to address a particular application.

One way of protecting private computer networks against BEC attacks is by email authentication. For example, DomainKeys Identified Mail (DKIM) or Sender Policy Network (SPF) may be employed to determine if an email was sent by an email server that is authorized to send emails on behalf of a sender. Still, emails that use misleading sender names may pass email authentication checks. Also, email authentication can be bypassed by malware that has infiltrated the company's private computer network. In that case, the malware may connect to the company's mail server from within the private computer network and send authenticated email. Email authentication can also be inadvertently bypassed by misconfiguration or by some user action.

Another way of protecting private computer networks against BEC attacks is to use content filters to identify phishing emails. A content filter may detect a phishing email by pattern matching (i.e., looking for signatures) or by machine learning. A BEC email is similar to a phishing email in that both employ some sort of social engineering technique to trick the recipient. However, in marked contrast to a phishing email, which is directed to the public in general, a BEC email is typically designed for a particular attack, sent to a particular user or organization. This makes BEC emails much more difficult to detect using generic content filtering approaches that are employed against phishing emails.

Another way of protecting private computer networks against BEC attacks is to employ author identification/authorship analysis techniques. For example, a system could monitor for emails that purport to come from an author and take actions on emails that do not meet criteria for emails sent by the purported author. Unfortunately, relying on authorship identification and analysis this way leads to high false alarm rates.

Figure 2:
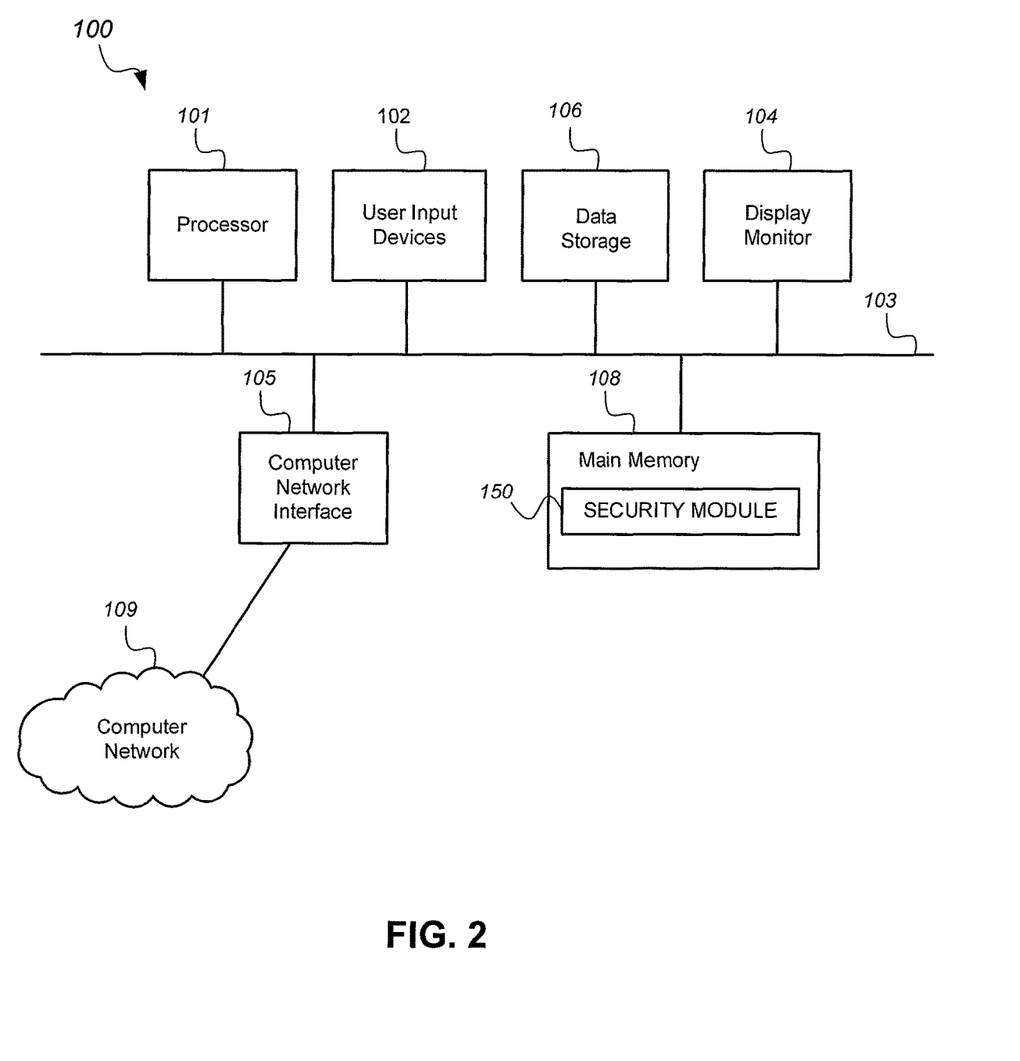
FIG. 2 shows a logical diagram of a computer in accordance with an embodiment of the present invention.

Referring now to FIG. 2, there is shown a logical diagram of a computer 100 in accordance with an embodiment of the present invention. The computer 100 is employed to host a security module 150 but may also be employed as any of the computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with one or more software modules, comprising instructions stored non-transitory in the main memory 108 for execution by the processor 101 to cause the computer 100 to perform corresponding programmed steps. An article of manufacture may be embodied as computer-readable storage medium including instructions that when executed by the processor 101 cause the computer 100 to be operable to perform the functions of the one or more software modules. In the example of FIG. 2, the software modules include the security module 150. As can be appreciated, the computer 100 may comprise a plurality of interconnected computers, with the functionality of the security module 150 being distributed among the plurality of interconnected computers.

Figure 3:
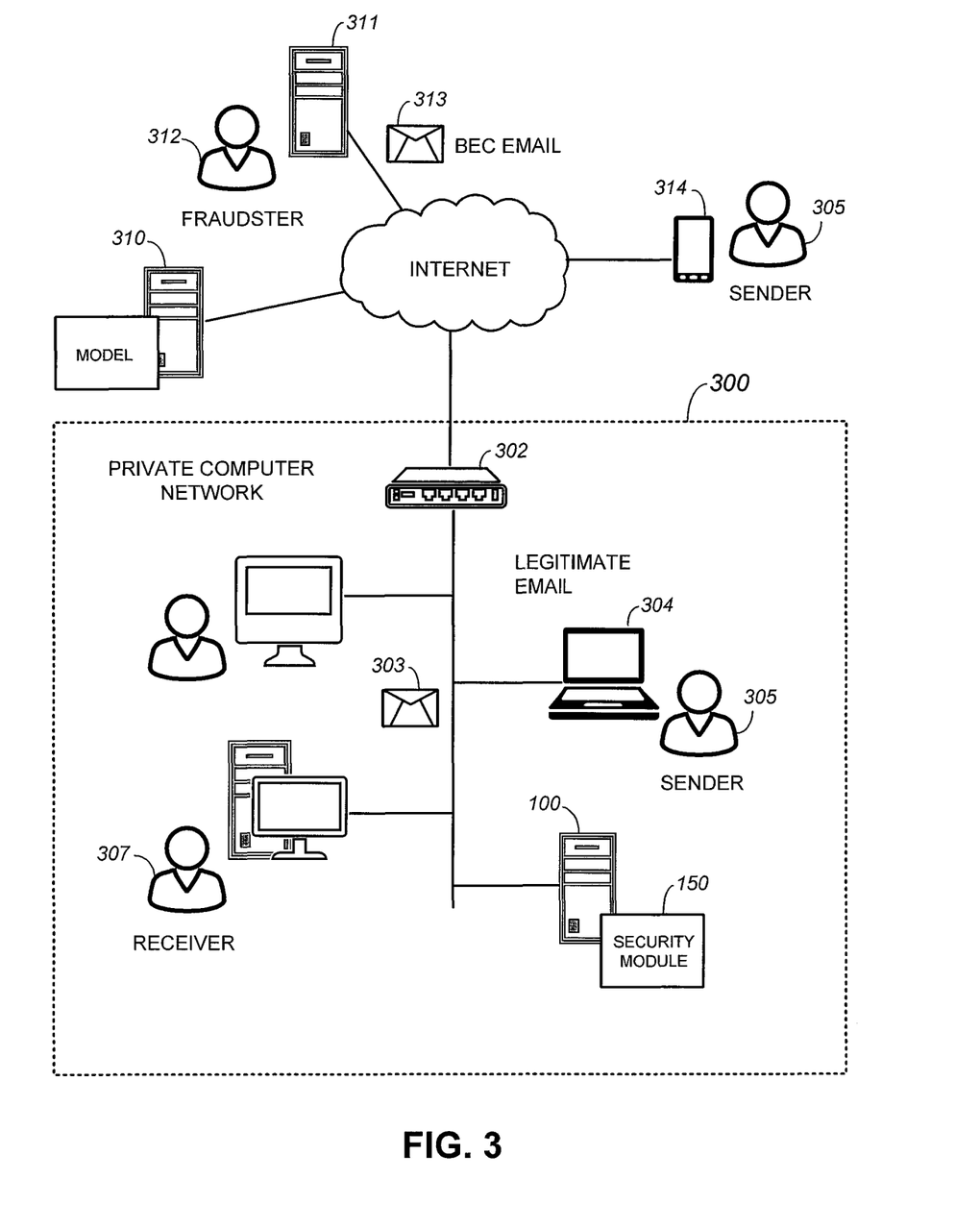
FIG. 3 shows a logical diagram of a private computer network in accordance with an embodiment of the present invention.

FIG. 3 shows a logical diagram of a private computer network 300 in accordance with an embodiment of the present invention. The private computer network 300 is "private" in that it is not generally accessible to the public. The private computer network 300 may be that of a company, government, university, or other organization. The private computer network 300 may comprise a plurality of computers within its perimeter, which may be protected by a gateway 302, firewall, and/or other computer. Users of the private computer network 300 may send and receive emails from within or outside the private computer network 300. More particularly, a user referred to as "sender 305" (e.g., an officer of the company, such as the CEO) may employ a computer 304 from within the private computer network 300 to send an email 303 to another user referred to as "receiver 307" (e.g., another officer of the company, such as the CFO). The email 303 is a "legitimate email" in that it was actually sent by the sender 305, i.e., the sender indicated in the email 303 is not forged. The sender 305 may also employ a mobile device 314 to send the email 303 from outside the private computer network 300.

A fraudster 312 may employ a computer 311 to initiate a BEC attack by sending a BEC email 313 to a user of the private computer network 300. As its name implies, the BEC email 313 is part of the BEC attack, and has a forged sender information. More particularly, the BEC email 313 purports to be sent by a user of the private computer network but is actually from the fraudster 312. In the example of FIG. 3, the BEC email 313 purports to be from the sender 305. The BEC email 313 may be addressed to the receiver 307, and instruct the receiver 307 to make a wire transfer to a financial account of the fraudster 312.

In the example of FIG. 3, the private computer network 300 includes the computer 100 with the security module 150. The security module 150 may be configured to monitor email traffic over the private computer network 300, and inspect the emails for BEC attacks. More particularly, the security module 150 is configured to inspect and analyze an email to determine whether or not the email is a BEC email.

As will be more apparent below, the security module 150 may include one or more machine learning models for inspecting emails for BEC attacks. The machine learning models may be trained within the private computer network 300, such as on the computer 100. The machine learning models may also be trained in-the-cloud, i.e., outside the private computer network, such as on the computer 310.

Figure 4:
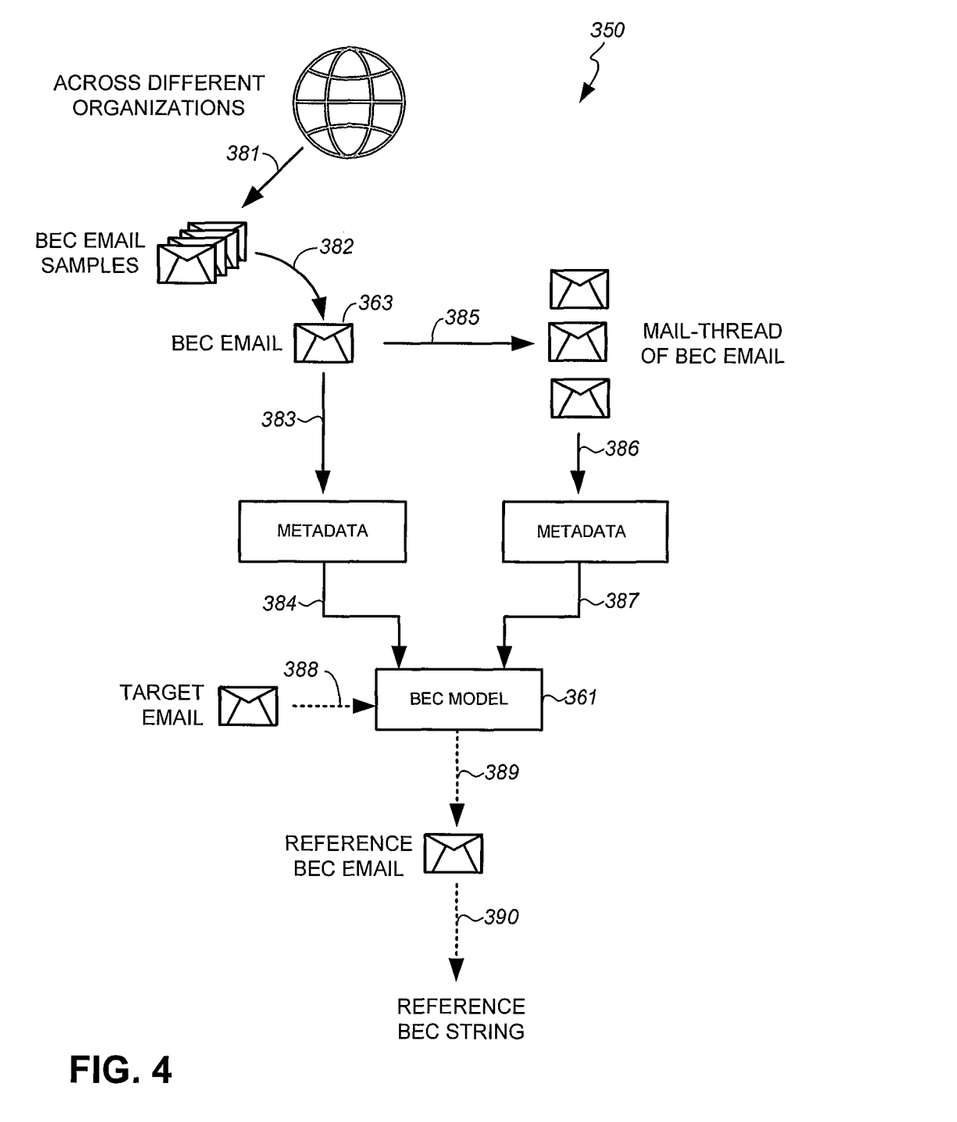
FIG. 4 show a flow diagram of a method of training one or more BEC models in accordance with an embodiment of the present invention.

FIG. 4 show a flow diagram of a method 350 of training one or more BEC models 361 in accordance with an embodiment of the present invention. In one embodiment, a BEC model 361 is part of the security module 150. A BEC model 361 may comprise one or more machine learning models that are configured to find, among a plurality of collected BEC email samples (i.e., known BEC emails), a BEC email with the same intention as and is most similar to an email being inspected for a BEC attack (also referred to herein as "target email"). An email's intention is what the sender is trying to accomplish or induce the recipient to perform. In one embodiment, email intentions include: requesting for money, requesting for a password, ask for a particular sensitive information, ask to open an attachment or click on a link, ask an employee to transfer money on behalf of an officer for personal reasons, changing a goods delivery location or delivery time, ask for contact information, etc.

In the example of FIG. 4, samples of known BEC emails are collected from across different organizations (see arrow 381). That is, the samples may be from known BEC emails detected at the private computer network 300, other computer networks not associated with the private computer network 300, honeypots, antivirus laboratories, etc. For each BEC email of the plurality of collected BEC email samples (see arrow 382), metadata are extracted from the BEC email (see arrow 383).

The metadata extracted from a BEC email may be used as features for training the BEC model 361 (see arrow 384). In one embodiment, the metadata extracted from a BEC email include date (for use as a timing feature), displayed sender name (for use as a purported sender feature), subject (for use as an intention identifying feature), signer from the message body of the email (for use as role identifying feature), content of the message body of the email (for use as an identifying feature), and other metadata typically used as features to train machine learning models for spam detection and other computer security applications (e.g., uniform resource locators (URLs), particular words and phrases, attachments, etc.). The BEC model 361 may be trained using these and other features to find a reference BEC email. In one embodiment, the BEC model 361 is trained using a gradient boosting tree, such as the XGBoost software. The BEC model 361 may also be trained using other suitable algorithms without detracting from the merits of the present invention.

In one embodiment, a reference BEC email is identified by the BEC model 361 from the collected BEC email samples and emails in the mail-thread of the collected BEC email samples. The reference BEC email is most similar to and has the same intention as a target email. That is, given a target email with an intention X (see arrow 388), the BEC model 361 is configured to find a reference BEC email (see arrow 389), among the collected BEC email samples and/or emails in the mail-threads of BEC emails, that has the same or similar intention X and is most similar to the target email. The text of the reference BEC email is output by the BEC model 361 as the reference BEC string (see arrow 390).

As noted above, the reference BEC email may also be found by the BEC model 361 from emails in the same mail-threads of the collected BEC email samples. A mail-thread comprises one or more emails that are forwards and/or replies to/from the BEC email. In the example of FIG. 4, emails in the mail-thread of the BEC email 363 are collected (see arrow 385), and metadata of the emails in the mail-threads are extracted (see arrow 386) and used as features for training the BEC model 361 (see arrow 387). In one embodiment, the metadata extracted from emails in the mail-thread of a BEC email includes language, timing (e.g., mail sending sequence), content that may be used to identify characteristics of the recipient (e.g., organization level of recipient, cluster on relationship between sender and recipient), content that may be used for forensic evidence taking, and metadata typically used as features for training machine learning models that are employed for spam detection and other computer security applications (e.g., uniform resource locators (URLs), particular words and phrases, attachments, etc.). The BEC model 361 may be trained using these and other features to find the reference BEC email.

Figure 5:
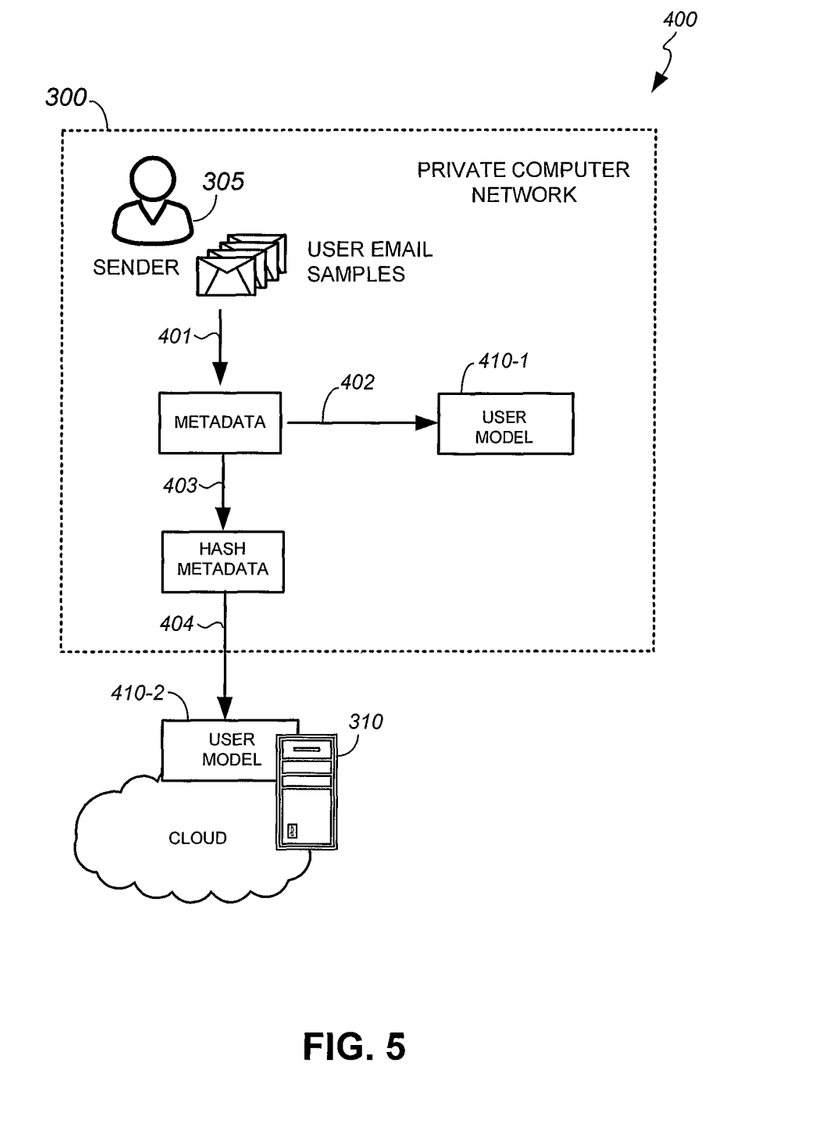
FIG. 5 shows a flow diagram of a method of training one or more users model in accordance with an embodiment of the present invention.

FIG. 5 shows a flow diagram of a method 400 of training a user model 410 in accordance with an embodiment of the present invention. In one embodiment, a user model 410 is part of the security module 150. A user model 410 may comprise one or more machine learning models that are configured to generate a reference user string, which comprises text of an email that a particular user would compose for a given intention.

A user model 410 is a personal machine learning model in that it is for a single, particular user. A user model 410 may be trained using emails sent by the particular user, which in the example of FIG. 5 is the sender 305. The training of a user model 410 may be performed within the private computer network 300, as is the case with a local user model 410-1. A user model may also be trained outside the private computer network, as is the case with a cloud user model 410-2 trained on the computer 310.

In the example of FIG. 5, a user model 410 is generated for the sender 305. Samples of emails sent by the sender 305 are collected from email archives and/or as emails are sent by the sender 305. Metadata of the collected user email samples are extracted for use as features for training the user model 410. The user model 410 may be trained using these and other features to generate a reference user string. The user model 410 may be trained using a generative model, such as a recurrent neural network (e.g., see F. Zivkovic and Derek Chen, "TrumpBot: Seq2Seq with Pointer Sentinel Model" at <<https://web.stanford.edu/classics224n/reports/2761183.pdf>>). The user model 410 may also be trained using other suitable algorithms without detracting from the merits of the present invention.

Metadata extracted from the collected user email samples (see arrow 401) may be employed to train the user model 410-1 locally within the private computer network 300 (see arrow 402). In one embodiment, to alleviate privacy concerns when training the user model 410-2 of the sender 305 in the cloud, the metadata are encoded to another format that cannot be decoded back to its original form. In one embodiment, the metadata are hashed into hash metadata (see arrow 403) before the metadata are sent out of the private computer network 300 by using a distance-sensitive hash function, such as a locality sensitive hash (e.g., Trend Micro Locality Sensitive Hash). The encoding from metadata to hash metadata may include non-style-token-identification, encryption-like actions (shuffle, digest, . . . ), and token to hash-value conversion. The hash metadata are then used to train the cloud user model 410-2 (see arrow 404).

In some embodiments, the local user model 410-1 may be combined with the cloud user model 410-2 for better precision and recall. In those embodiments, both the local and cloud user models are trained with hash metadata if any one of the user models is trained with hash metadata. For noise reduction, an intention filtering model may be optionally employed to filter out hash metadata that are related to known threats or system-wide and whitelist related mails.

In embodiments where hash metadata of the user email samples are employed to train the user model 410, the BEC model 361 may also be trained using hash metadata of the BEC email samples. In those embodiments, when a target email is received for inspection for a BEC attack, the metadata of the target email are also hashed using the same function as that used in the training of the user model 410 and the BEC model 361. This facilitates similarity comparisons of the texts of the target email, the reference BEC string, and the reference user string.

Figure 6:
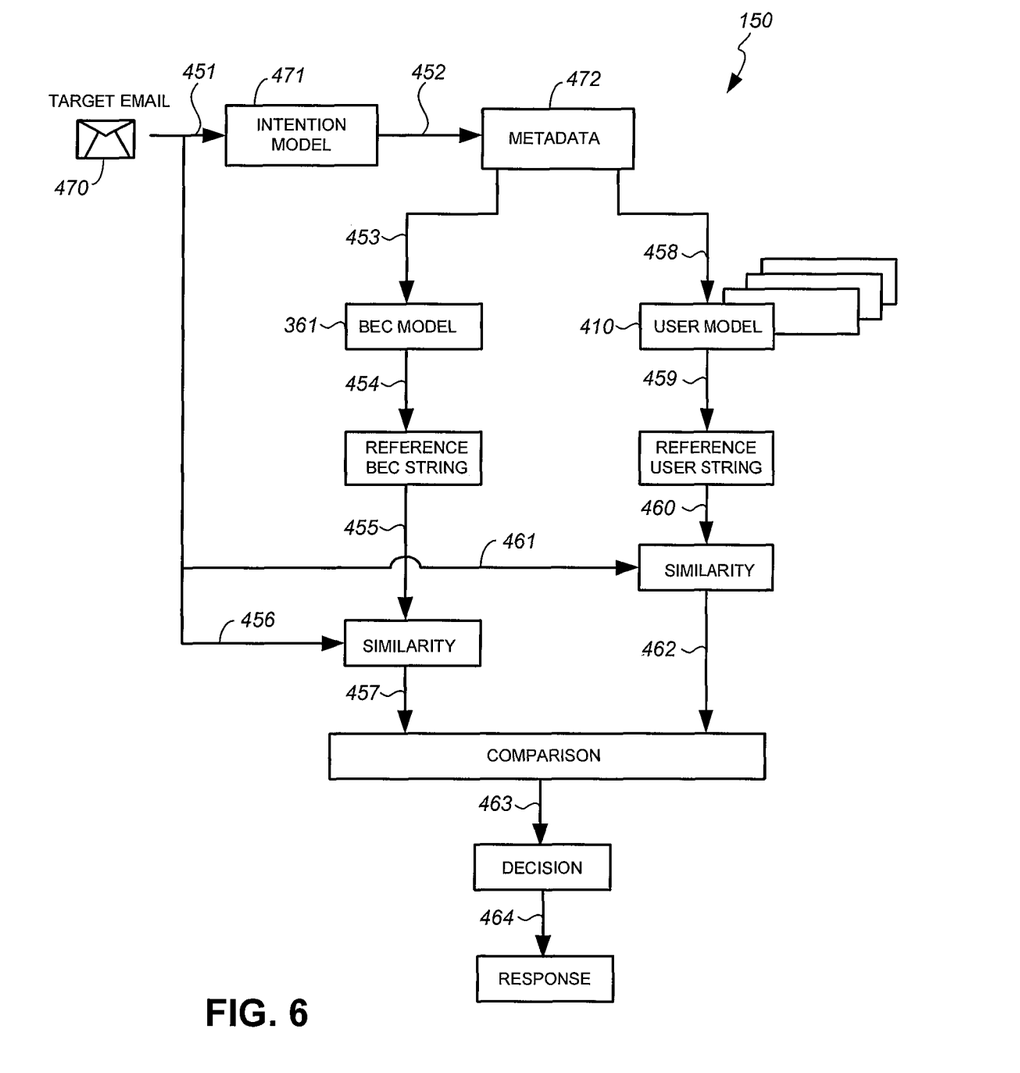
FIG. 6 shows a logical diagram of a security module in accordance with an embodiment of the present invention.

FIG. 6 shows a logical diagram of the security module 150 in accordance with an embodiment of the present invention. In one embodiment, the security module 150 includes a BEC model 361 and a plurality of user models 410. In the example of FIG. 6, the computer 100 or other computer hosting the security module 150 receives a target email 470 (see arrow 451). The security module 150 may include an intention model 471 that has been trained to detect the intention of the target email. The priority of inspecting the target email 470 for a BEC attack may be adjusted based on the intention of the target email. For example a target email with an intention of inducing a recipient to make an urgent wire transfer may be inspected before a target email with an intention of soliciting for general, non-sensitive information. An intention model 471 is optional in that the BEC model 361 and the user model 410 are also trained to detect the intention of the target email 470. However, the BEC model 361 and the user model 410 are not being used for pre-processing in the example of FIG. 6, i.e. they are downstream of the inspection process, and are thus not suitable for prioritization purposes.

The metadata 472, which are features that were used to train the BEC model 361 and the user model 410, are identified and extracted from the target email 470 (see arrow 452). The metadata 472 are input to the BEC model 361 to find a BEC email that has the same intention and is most similar to the target email 470 (see arrow 453). The BEC model 361 outputs a reference BEC string, which comprises the text of the found BEC email (see arrow 454). The similarity of the reference BEC string (see arrow 455) to the text of the target email 470 (see arrow 456) is determined (see arrow 457). Similarity between texts may be in terms of a similarity score, and determined by calculating the Hamming or Euclidian distance between the texts. Other suitable similarity algorithms may also be employed.

A user model 410 of the purported sender of the target email 470 is selected from among the plurality of user models 410. The metadata 472 of the target email 470 are input to the user model 410 (see arrow 458) of the purported sender to generate an email that the purported sender would compose for the same intention as that of the target email 470. The text of the email generated by the user model 410 is output as the reference user string (see arrow 459). The similarity of the reference user string (see arrow 460) to the text of the target email 470 (see arrow 461) is determined to obtain a similarity score (see arrow 462).

The similarity score of the target email 470 and the reference BEC string (see arrow 457) is compared to the similarity score of the target email 470 and the reference user string (see arrow 462) to make a decision (see arrow 463) as to whether the target email 470 is a BEC email or a legitimate email. If the target email 470 is more similar to the reference BEC string than to the reference user string, the target email 470 is deemed to be a BEC email. Otherwise, if the target email 470 is more similar to the reference user string than to the reference BEC string, the target email 470 is deemed to be a legitimate email.

One or more response actions may be initiated by the security module 150 in the event that the target email 470 is deemed to be a BEC email (see arrow 464). For example, a target email 470 that is deemed to be a BEC email may be stamped with a warning message before being sent to the recipient. The warning message may be conspicuous to clearly indicate that the target email 470 has been found to be a BEC email. This allows the recipient to double check with the purported sender, which is advantageous in cases where the purported sender may be in a situation where his or her message composition may lead to an erroneous determination.

As another example, a target email 470 that is deemed to be a BEC email may be blocked (e.g., quarantined). The recipient and/or network administrator may be notified in that event. Access of the recipient to other network resources may also be restricted because a BEC attack is particularly tailored, i.e., the recipient has been selected as the target of an attack.

Yet another example, a target email 470 that is deemed to be a BEC email may be quarantined and a verification email is sent to the purported sender's known email address. The target email 470 may be released from quarantine and sent to the recipient only after the purported sender confirms that he or she sent the target email 470. Otherwise, the target email 470 will remain in quarantine (e.g., for forensic investigation) or be deleted.

An example scenario addressed by the security module 150 may be as follows. A target email may be purportedly sent by a CEO named "Bob". The content in the message body of the target email may have the following TEXT1:

TEXT1: "Hi, please do the following wire transfer right away!!!--Bob"

In this example, the intention of the target email has been found to be {Feature A (Need money), Feature B (Time constraint is urgent)}. From the personal user model 410 of Bob, for the same intention, Bob would send the message M(Feature A, Feature B), which may have the following TEXT2:

TEXT2: "Hi, please do the wire transfer ASAP, Bob"

In this example, Bob typically uses the term "ASAP" instead of "right away", and that would be reflected in the distance calculation between the text of the target email and the reference user string. Using the BEC model 361, the found closest BEC email with the same intention may have the following TEXT3:

TEXT3: "Hi, please do the following wire transfer to the following account, ---Bob".

In this example, TEXT1 is closer to TEXT3 than to TEXT2. Therefore, the target email is deemed to be a BEC email.

Figure 7:
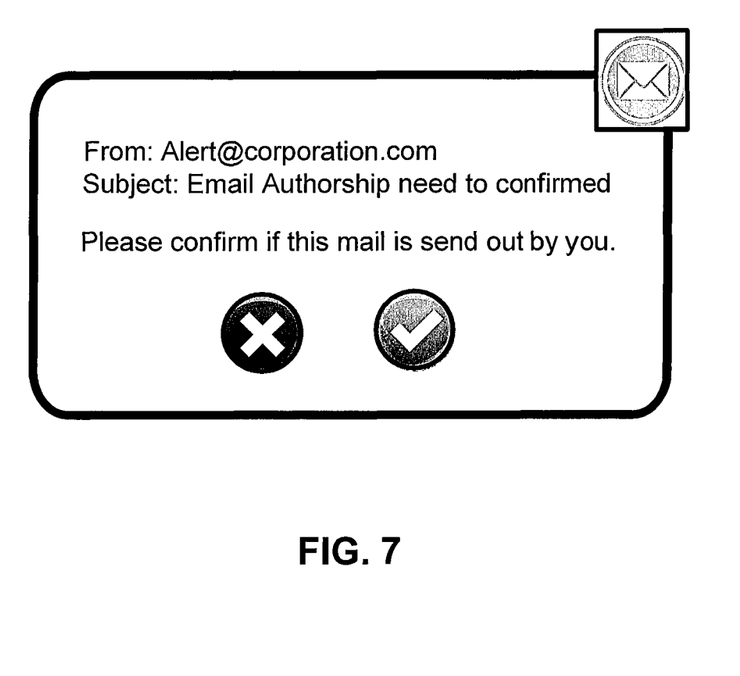
FIG. 7 shows an example notification email that may be sent for verification in accordance with an embodiment of the present invention.

FIG. 7 shows an example notification email that may be sent for verification in accordance with an embodiment of the present invention. The purported sender may confirm or deny that he or she sent the target email 470 (attached to the notification email or in the mail-thread of the notification email) by clicking a link on the notification email, replying to the notification email with a designated subject, sending a text message with a code (included in the email) to a designated phone number, etc. The feedback provided by the purported sender may be employed to re-train the user model 410 (in the event the purported sender did send the target email 470) or the BEC model 361 (in the event the target email 470 was not sent by the purported sender). The feedback may be distance-hashed to protect the privacy of the purported sender.

Figure 8:
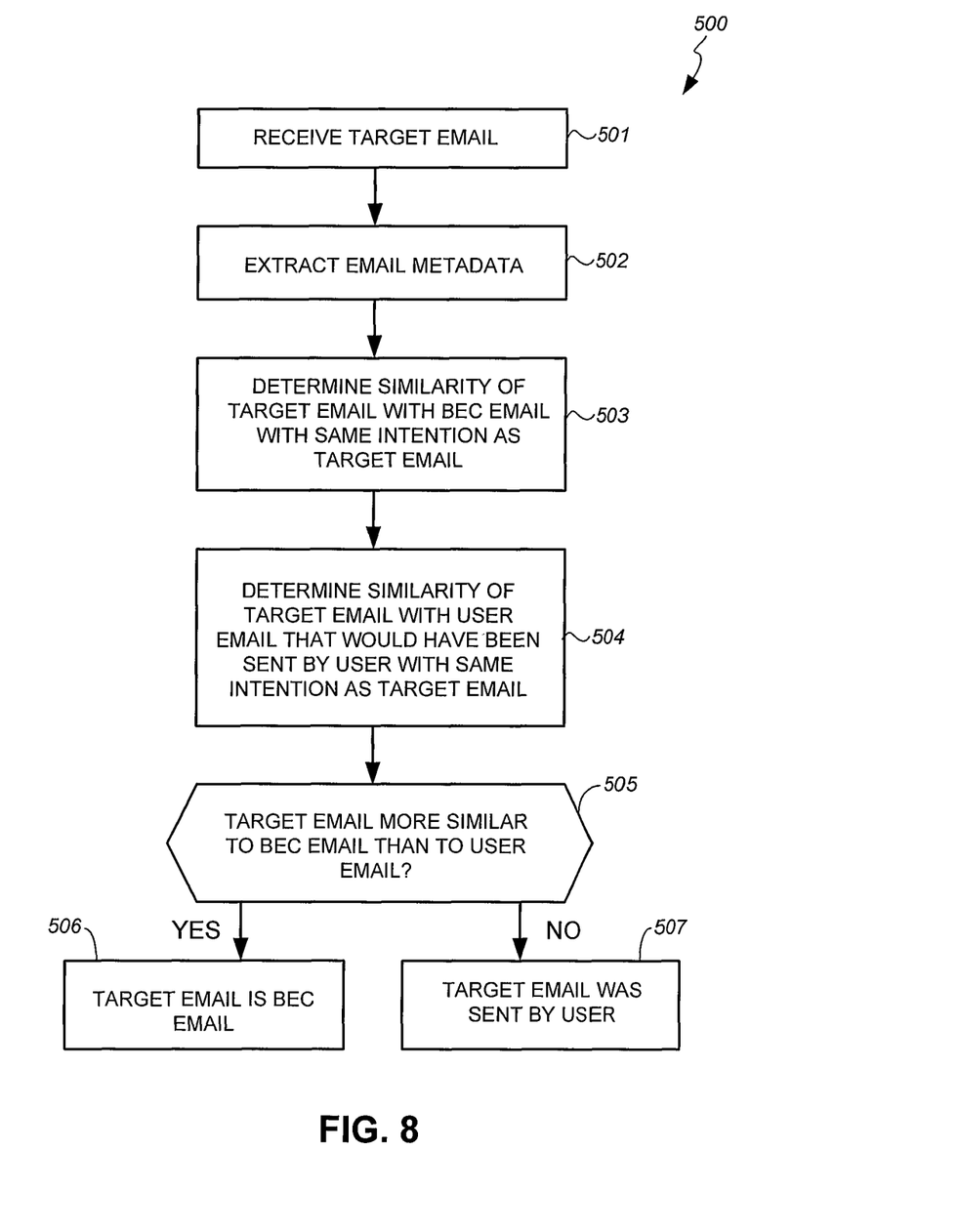
FIG. 8 shows a flow diagram of a method of detecting a BEC attack in accordance with an embodiment of the present invention.

FIG. 8 shows a flow diagram of a method 500 of detecting a BEC attack in accordance with an embodiment of the present invention. The method 500 may be performed by the computer 100 (see FIG. 3) with a processor and a memory. The memory of the computer 100 may include instructions of the security module 150. The processor executes the instructions in the memory to cause the computer 100 to perform the method 500. As can be appreciated, the method 500 is explained using previously described components for illustration purposes only. Other components may also be used without detracting from the merits of the present invention.

Referring to FIG. 8, in step 501, a target email is received in the computer 100 that runs the security module 150. The target email is sent by a sender that purports to be an officer (or another employee) of a company and is addressed to a recipient, which is also an employee of the company.

In step 502, metadata corresponding to features used to train the BEC model 361 and the personal user model 410 of the officer of the company are extracted from the target email.

In step 503, the similarity of the target email to a BEC email with the same intention as a target email is determined. Step 503 may be performed by using the BEC model 361 with the extracted metadata of the target email to find a BEC email that has the same intention and is most similar to the target email. The distance between the text of the target email and the text of the found BEC email may be calculated to generate a similarity score that indicates the similarity of the target email to the found BEC email.

In step 504, the similarity of the target email to an email that would've been sent by the officer of the company is determined. Step 504 may be performed by using the personal user model 410 of the officer of the company to generate a user email with the same intention as the target email. The distance between the text of the target email and the text of the generated user email may be calculated to generate a similarity score that indicates the similarity of the target email to the generated user email.

In step 505, the similarity of the target email to the found BEC email is compared to the similarity of the target email to the generated user email. If the target email is more similar to the found BEC email than to the generated user email, the target email is deemed to be a BEC email and not sent by the officer of the company (step 506). Otherwise, if the target email is more similar to the generated user email than to the found BEC email, the target email is deemed to be a legitimate email sent by the officer of the company (step 507).

Methods and systems for detecting BEC attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a target email, the target email being from a sender and is addressed to a recipient, the sender purportedly being an employee of a company;
finding a particular business email compromise (BEC) email that has a same intention as the target email, the intention being what the sender is inducing the recipient to perform;
after receiving the target email, generating a user email with a message that includes words the employee typically uses for the same intention as the target email;
determining similarity of the target email to the user email;
determining similarity of the target email to the found particular BEC email;
deeming the target email was not actually sent by the employee when the target email is more similar to the particular BEC email than to the user email; and
in response to deeming the target email was not actually sent by the employee, blocking the target email.

2. The method of claim 1, further comprising:
deeming the target email to be a legitimate email actually sent by the employee when the target email is more similar to the user email than to the particular BEC email.

3. The method of claim 1, wherein blocking the target email comprises:
putting the target email in quarantine.

4. The method of claim 3, further comprising:
sending a notification to the employee; and
releasing the target email from quarantine when the employee verifies that the employee sent the target email.

5. The method of claim 1, further comprising:
extracting metadata from the target email;
inputting the extracted metadata to a BEC machine learning model to select the particular BEC email, the BEC machine learning model having been trained using a plurality of samples of known BEC emails; and
inputting the extracted metadata to a personal user machine learning model to generate the user email, the personal user machine learning model having been trained using a plurality of samples of emails sent by the employee.

6. The method of claim 5, further comprising:
re-training the personal user machine learning model with the target email when the employee verifies that the employee sent the target email.

7. A computer-implemented method comprising:
receiving a target email from a sender, the sender purportedly being a particular user;
selecting, from among a plurality of business email compromise (BEC) emails, a particular BEC email that has a same intention as and most similar to the target email, the intention being what the sender is inducing a recipient of the target email to perform;
determining similarity of the target email with the particular BEC email;
after receiving the target email, generating a user email with a message that includes words typically used by the particular user for the same intention as the target email;
determining similarity of the target email with the user email;
deeming the target email to be part of a BEC attack and not sent by the particular user when the target email is more similar to the particular BEC email than to the user email; and
in response to deeming the target email to be part of the BEC attack and not sent by the particular user, blocking the target email.

8. The method of claim 7, further comprising:
deeming the target email to be a legitimate email actually sent by the particular user when the target email is more similar to the user email than to the particular BEC email.

9. The method of claim 7, further comprising:
extracting metadata from the target email;
inputting the extracted metadata to a BEC machine learning model that has been trained using the plurality of BEC emails to select the particular BEC email; and
inputting the extracted metadata to a personal user machine learning model that has been trained using a plurality of samples of emails sent by the particular user to generate the user email.

10. The method of claim 7, wherein blocking the target email comprises:
putting the target email in quarantine.

11. The method of claim 10, further comprising:
sending a notification to the particular user; and
releasing the target email from quarantine when the particular user verifies that the particular user sent the target email.

12. The method of claim 11, further comprising:
re-training the personal user machine learning model with the target email when the particular user verifies that the particular user sent the target email.

13. A
a computer comprising a processor and a memory, the memory comprising instructions that when executed by the processor cause the computer to:
receive a target email in a private computer network, the target email being from a sender and is addressed to a recipient, the sender purportedly being a user of the private computer network;
determine similarity of the target email with a known business email compromise (BEC) email of a BEC attack;
after the target email has been received in the private computer network, generate a user email with a message that includes words typically used by the user of the private computer network for a same intention as the target email, the intention being what the sender is inducing the recipient to perform;
determine similarity of the target email with the user email;
deem the target email to be part of the BEC attack and not sent by the user of the private computer network when the target email is more similar to the known BEC email than to the user email; and
in response to deeming the target email to be part of the BEC attack and not sent by the user of the private computer network, block the target email.

14. The computer of claim 13, wherein the instructions when executed by the processor further cause the computer to:
deem the target email to be a legitimate email actually sent by the user of the private computer network when the target email is more similar to the user email than to the known BEC email.

15. The computer of claim 13, wherein the instructions when executed by the processor further cause the computer to:
- extract metadata from the target email;
- input the extracted metadata to a BEC machine learning model that has been trained using a plurality of samples of emails of known BEC attacks to find the known BEC email; and
- generate the user email by inputting the extracted metadata to a personal user machine learning model that has been trained using a plurality of samples of emails sent by the user of the private computer network.

16. The computer of claim 13, wherein the instructions when executed by the processor cause the computer to block the target email by putting the target email in quarantine.

17. The computer of claim 16, wherein the instructions when executed by the processor further cause the computer to:
- send a notification to the user of the private computer network; and
- release the target email from quarantine when the user of the private computer network verifies that he or she sent the target email.

\* \* \* \* \*